July 5, 1938. W. C. WAGNER 2,122,597
PRESSURE COMPENSATOR
Filed July 6, 1935 5 Sheets-Sheet 2

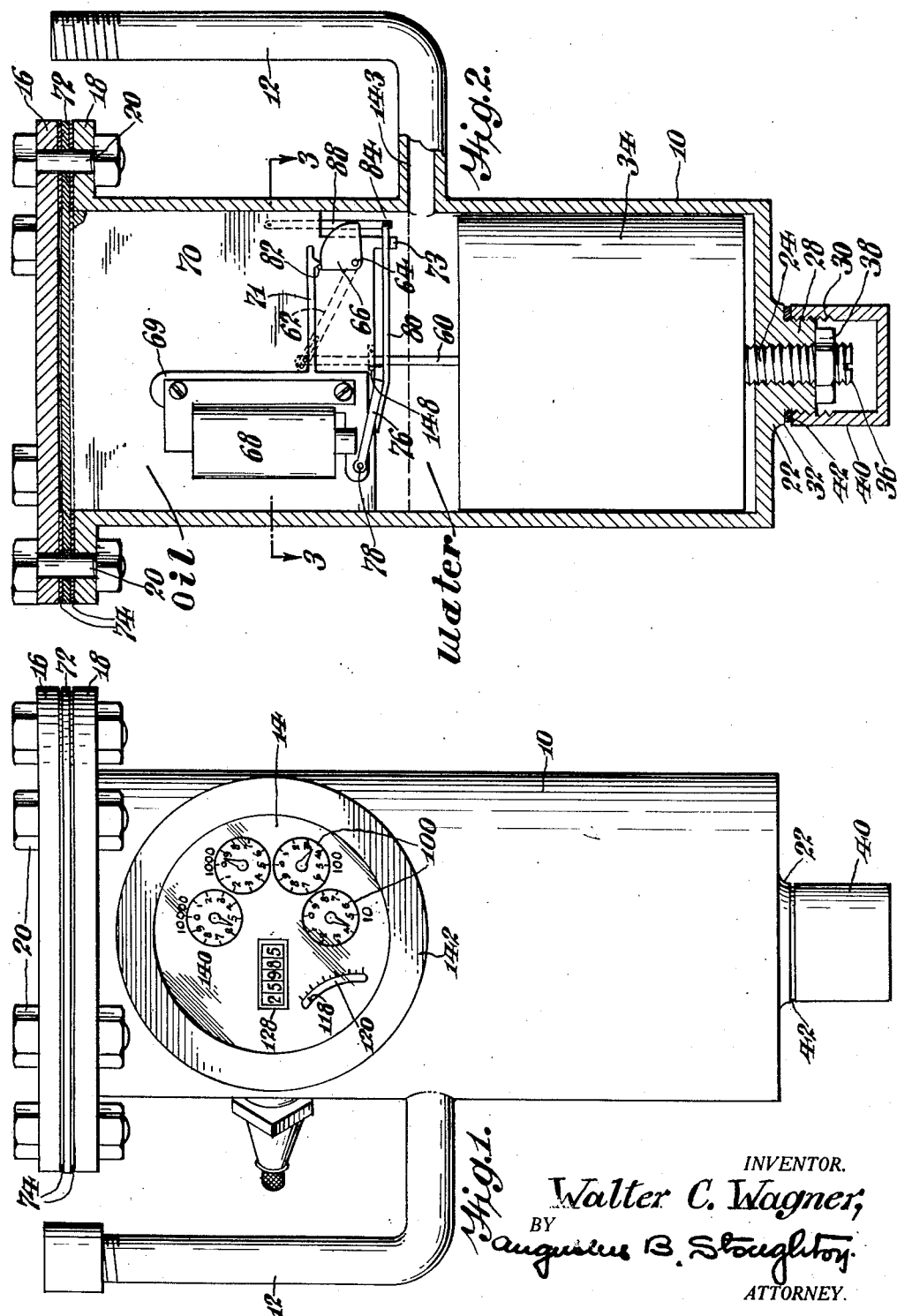

INVENTOR.
Walter C. Wagner,
BY Augustus B. Stoughton.
ATTORNEY.

July 5, 1938. W. C. WAGNER 2,122,597
PRESSURE COMPENSATOR
Filed July 6, 1935 5 Sheets-Sheet 3
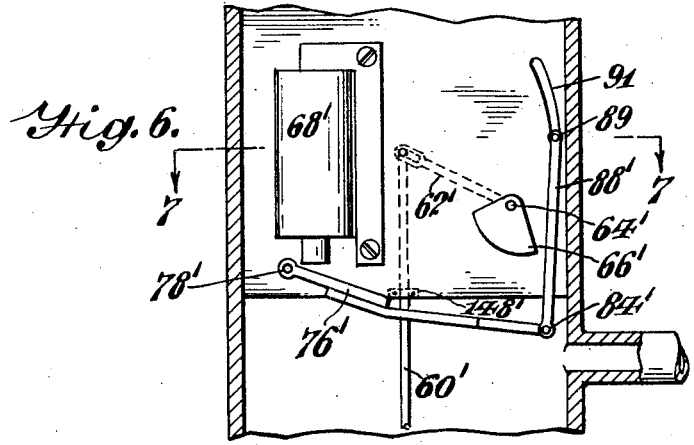
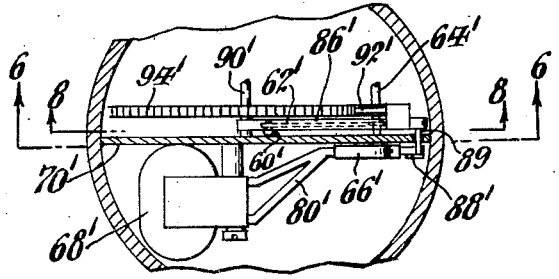
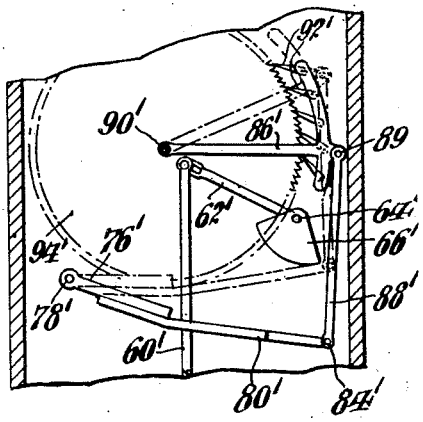
INVENTOR.
Walter C. Wagner,
BY
Augustus B. Stoughton.
ATTORNEY.

July 5, 1938.  W. C. WAGNER  2,122,597
PRESSURE COMPENSATOR
Filed July 6, 1935  5 Sheets-Sheet 4

WITNESS:

INVENTOR
Walter C. Wagner
BY Augustus B. Stoughton
ATTORNEY.

July 5, 1938. W. C. WAGNER 2,122,597
PRESSURE COMPENSATOR
Filed July 6, 1935 5 Sheets-Sheet 5

INVENTOR
Walter C. Wagner
BY
Augustus B. Stoughton
ATTORNEY.

WITNESS:
Robt R Mitchel.

Patented July 5, 1938

2,122,597

UNITED STATES PATENT OFFICE 2,122,597

PRESSURE COMPENSATOR

Walter C. Wagner, Ardmore, Pa.

Application July 6, 1935, Serial No. 30,209

6 Claims. (Cl. 73—233)

This invention relates to metering of flow of gases and vapors, and, in particular, relates to a pressure compensator.

Heretofore, pressure compensators to be used in conjunction with gaseous or vapor flow meters, to permit direct registration in units of weight or in units of volume at a standard pressure, required highly complicated mechanisms comprising delicate parts which easily lost their adjustment, and had intermittently meshing gear trains which did not always function properly, or caused errors.

The primary object of my invention is to provide a device in which these defects are overcome.

Another object of my invention is to provide a pressure compensator which can be readily and simply adjusted under operating conditions.

Still a further object of my invention is to provide a device which will automatically compensate for pressure, readings of a gas or vapor flow meter operated under conditions of variable pressure, and will register the flow directly in units of weight or volume at a standard pressure.

Another object of my invention is to produce a pressure compensator for gaseous or vapor flow meters, which is simple, rugged, accurate and efficient.

With these and other objects in view which will become apparent as the description proceeds, my invention consists essentially of a pressure-tight housing adapted to be connected to a gas or vapor transmitting system operating under pressure, said housing containing a compressible gas confined within a closed chamber capable of being compressed by the system pressure transmitted through a liquid medium, a float member supported on the surface of said liquid externally to said closed chamber, and two impulse integrating mechanisms, one adapted to increase a registered total by a constant quantity for each impulse, and the other adapted to increase another registered total, for each impulse, by a quantity which is varied according to a predetermined function of the simultaneous system pressure.

The invention, both as to details of construction and combination of parts, will best be understood from the following description of a specific embodiment which I illustrate as an example, when read in connection with the accompanying drawings, in which:

Figure 1 is a side elevational view of my pressure compensator.

Figure 2 is a side elevational view, partly in section on the line 2—2 of Fig. 3, of the device of Figure 1.

Figure 6 is a fragmentary side elevational view, partly in section on line 6—6 of Figure 7, of a modification of my pressure compensator.

Figure 7 is a fragmentary section on the line 7—7 of Figure 6.

Figure 8 is a fragmentary section on the line 8—8 of Figure 7.

Figure 3:
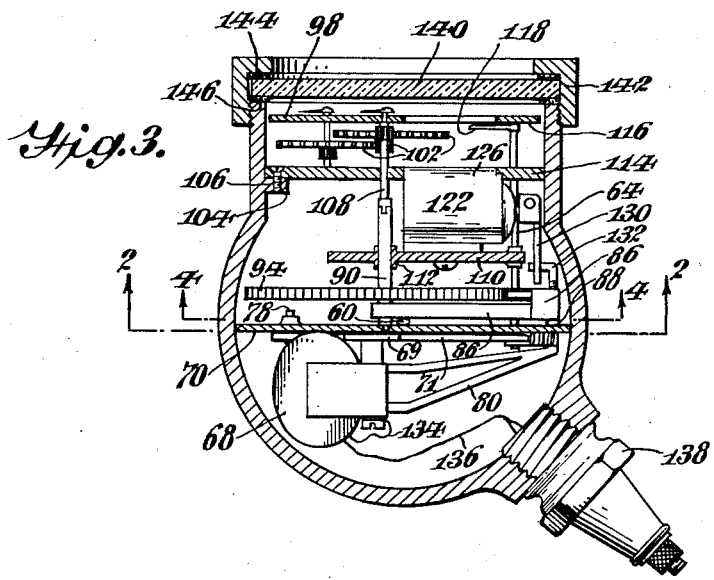
Figure 3 is a section on the line 3—3 of Figure 2, with parts omitted for the sake of clarity.
Figure 4:
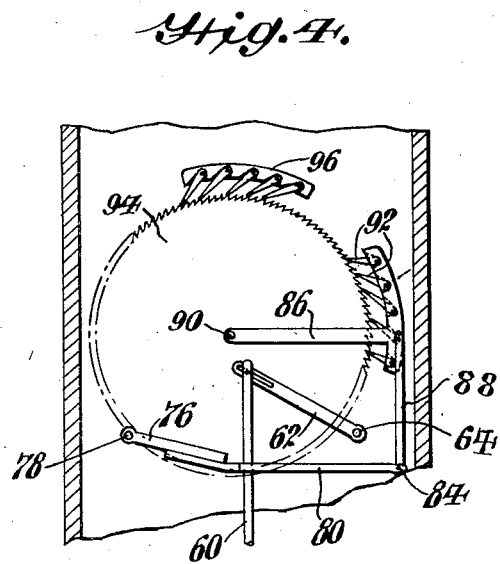
Figure 4 is a fragmentary section on the line 4—4 of Figure 3.
Figure 5:
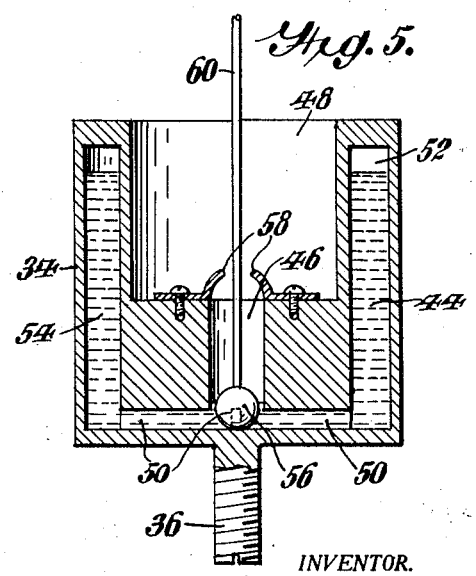
Figure 5 is a side elevational view, partly in section, of the float and compression chamber, showing the float at its lower limit.

Referring to the drawings, I have shown in Figure 1 a housing 10 having an L extension 12 at one side and a cylindrical register face 14 at the front of housing 10. The housing 10 is provided with a cover plate 16 secured to a flange 18 by bolts 20. Pressure is transmitted to the device by means of the L 12 which is hollow and communicates with the interior of housing 10.

Beneath the housing 10 is a cylindrical stud 22 having a threaded bore 24 communicating with the internal space of housing 10, a reduced portion 28 having external threads and a shoulder 32. At the bottom of the housing rests a cylindrical float chamber 34 which is provided with a screw-threaded lower extension 36 adapted to be screwed into and project through the lower opening 24 of the housing.

A lock nut 38 screws on the projecting portion of extension 36 and permits adjustment of the height of the chamber 34 within the housing.

A screw-cap 40 is secured to the reduced portion 28 by means of threads 30, and a ring gasket 42 seated between the shoulder 32 and screw-cap 40 permits pressure sealing.

The float chamber 34 consists of an outer annular space 44, a concentric cylindrical space 46 occupying the lower inner portion of the chamber 34, and a larger concentric cylindrical space 48 occupying the upper inner portion of chamber 34 and communicating directly with space 46. Radial apertures 50 intercommunicate the lower ends of spaces 44 and 46.

A gas 52, such as air, is placed in the float chamber and a liquid 54, preferably mercury, is poured into the space 48. When pressure is applied to the surface of the mercury 54, it is transmitted to the gas 52, which is thereby compressed, the mercury thereupon rising in the space 44 and falling in the spaces 48 and 46. The spaces 44, 46, and 48 are so proportioned that the mercury level in the inner spaces 46 and 48 is entirely within the space 46, over the range of pressure for which the device is designed to operate.

A float 56 floats on the surface of the mercury, rises and falls in space 46, and is prevented from rising above that space by stops 58 when the pressure is released and the mercury rises into space 48. A stem 60 is attached to float 56 and is connected at the upper end by a pin and slot connection to a lever 62, which is fixed to a rotatable shaft 64. Said shaft 64 carries a cam 66 whose angular position is thus determined by float 56.

An electromagnet 68 is mounted on a bracket 69 which is pivotally mounted on a pin 70 carried by a plate 70 which is suspended from a disk 72 fitting between the flange 18 and cover 16, and separated therefrom by gaskets 74 to permit a pressure seal. The armature 76 of electromagnet 68 is independently pivoted on pin 78 and carries a lever 80 which is linked at its outer end 84 to an oscillating lever 86 by a link 88. Lever 86 oscillates about an axle 90 and carries a series of pawls 92, which engage a ratchet wheel 94, also carried on axle 90, said pawls being proportioned so that they come into action alternately, so that the wheel 94 can be positively advanced fractional distances of the teeth. A bracket 96 secured to plate 70 carries a similar set of pawls to prevent reversal of rotation of the wheel 94 when lever 86 drops back to its lower position, after release of armature 76.

The electromagnet bracket 69 is provided with an extension arm 71 carrying a cam follower 82 which bears on cam 66. The angular position of electromagnet 68 about pin 78 is thus controlled through the cam 66 by the position of float 56. The movement of lever 80 is limited at its lower position by a fixed stop 73 attached to plate 70, and at its upper position by the pole faces of electromagnet 68, against which armature 76 comes to rest when said electromagnet is energized.

The cam 66 is shaped so that the amount of movement of wheel 94 for each impulse of the electromagnet is controlled according to any desired relationship with the pressure.

A register 98 bearing dials 100 and a gear train 102 is secured to projecting lugs in the housing 10 by machine screws. A lug 104 and screw 106 are shown in Fig. 3. The main shaft 108 of register 98 is separately secured to axle 90. A plate 110, suspended from disk 72 similarly to plate 70, carries a bearing 112 for axle 90, which is also journaled in plate 70. Cam shaft 64 is similarly journaled in plates 70 and 110, extends through the rear plate 114 of register 98 almost to the front register plate 116, and carries on its end a vane 118 which is visible externally through the slot 120 in register plate 116, the external edge of said slot being graduated so that the pressure may be read from the position of vane 118.

A ratchet counter 122 is secured to plate 110 so that its index is visible through an aperture 126 in plate 114 and an aperture 128 in place 116. This counter is operated by means of a lever arm 130 which bears a slot in which slides a finger 132 secured to oscillating lever 86, so that for each oscillation of lever 86 the counter is advanced a single digit. The operating throw of lever 130 necessary to operate counter 122 is sufficiently flexible to insure reliability of operation over a very wide range of movement of lever 86, as fixed by cam 66.

Electric impulses transmitted from some external source are conducted to electromagnet 68 by means of leads 134 and 136, lead 134 being shown grounded to the metal parts and lead 136 being connected to a terminal in an electrically insulated pressure proof bushing 138.

The register face 14 is covered by a glass plate 140 which is secured by an apertured cap 142 screw threaded to housing 10 and pressure sealed by means of ring gaskets 144 and 146.

The operation of the device, for example, when connected to compensate a steam meter, is as follows:

Mercury is poured into the float chamber 34 to a fixed level near the top of space 48. The case is then filled with an electric insulating lubricating oil (not shown) and the cover bolted into place. Oil pressure with a test pressure gauge is then applied to the top opening of L 12 until some pressure within the normal operating range is reached. The reading of vane 118 on scale 120 is noted, and, if not the same as on the test gauge, the cap 40 is removed, lock nut 38 loosened and screw 36 turned up or down until vane 118 indicates the correct pressure, after which the lock nut is tightened and the cap replaced. The device is now ready to be attached to the steam line.

An uncompensated volume or rate-of-flow measuring steam meter (not illustrated) adapted to transmit electrical impulses for predetermined fixed units of steam flow is attached to the mains to be metered and a pressure tap-off is taken for the pressure compensator and attached to L 12. The steam pressure acting on the device compresses the gas 52 in space 44, causing the oil in L 12 to be forced into housing 10 accompanied by water condensed from the steam. This water will gradually displace the oil up to the upper level 143 of the horizontal section of L 12. Oil will remain above this level and provide lubrication and protection from corrosion for all the mechanism with the exception of the float chamber and float. The float will assume a position depending on the mercury level and will force cam 66 and vane 118 to the position corresponding to the pressure applied, thereby also raising or lowering the upper limit of movement of lever 80. When an electric impulse is received from the steam meter through leads (not shown) electrically connecting said meter to the housing and to the terminal in bushing 138, the electromagnet 68 is energized, raising armature 76, lever 80, link 88, and lever 86, and causing wheel 94 to advance a distance corresponding to the movement permitted between the fixed lower position of lever 86 and an upper position determined by the angular position of electromagnet 68 about pin 78, which in turn is controlled by the position of float 56 through stem 60, and cam 66. One of the pawls of bracket 96 then locks the wheel 94 so that the return of lever 86 will not cause reverse rotation. This advance of wheel 94 is registered on the register dial train. Simultaneously, the finger 132 lifts the counter operating lever 130 and adds another digit to the counter index 124. The counter reading permits a check against the reading of the meter transmitting the electrical impulses.

This device thus not only registers compensated and uncompensated quantities, but also permits a direct reading of the steam pressure.

A modification of my invention is shown in Figures 6, 7, and 8, in which the cam 66' is relieved of the weight of electromagnet 68' and is used instead as an upper stop to limit the movement of lever 80', so that the magnitude of said movement is determined by the position of the float through stem 60', lever 62', and the angular position of cam 66'. Except for the short interval during which the electromagnet 68' is energized and lever 80' therefore held tightly against cam 66', said cam is free to follow the movement of the float and float stem 60' without any restraining force such as friction of the cam follower, magnet bracket, or the like.

In this modification it will be observed that electromagnet 68' is rigidly fastened to plate 70'. When electromagnet 68' is energized, it raises armature 76' and lever 80' until the latter strikes against cam 66' and is brought to a stop, this being the upper limit of the throw. The movement is transmitted to lever 86' and ratchet wheel 94' through the link 88' and pin 89, said pin connecting lever 86' and link 88' and being of sufficient length to project through curved slot 91 in plate 70'. Pin 89, resting at the bottom of slot 91, determines the lower limit of movement of lever 80' and associated mechanisms.

The modification of Figures 6 to 8, inclusive, is otherwise identical in construction and operation with the device of Figures 1 to 5, inclusive.

Although the illustrated embodiment of my invention has been shown as having a float chamber of cylindrical shape with the float at its center, for the purpose of maintaining substantial accuracy despite the device being considerably off from a true vertical position, the chamber may have any desired shape or form. Instead of using mercury as the pressure transmitting in the float chamber, any other liquid which will not be diluted or added to by extraneous fluids may be used.

In the embodiments hereinbefore described, mercury and oil were used in the device, and for steam metering use the oil was displaced by water during use. With the use of an iron, steel or stainless steel float, the water would not cause a practical change in the pressure adjustment. If desired, however, the water can be initially added and the pressure test made under water pressure, or the device can be tested in the field under operating conditions.

If desired, the pressure may be applied to the device by way of a U trap containing sufficient mercury to compensate for the compression of the gas in space 44. In this case, also, the mercury can be adjusted so that the internal and external levels are approximately the same under operating pressures.

Figures 10, 11:
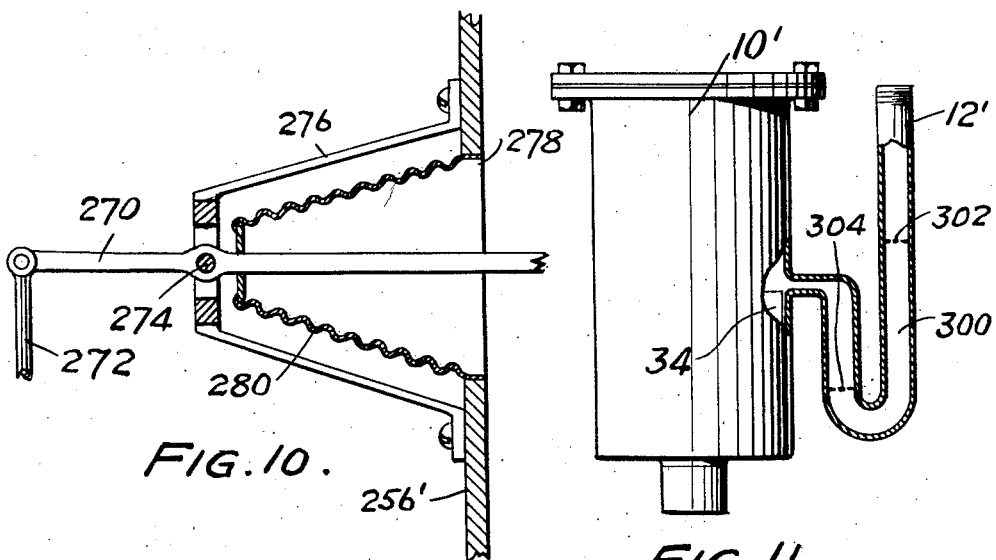
Fig. 10 is a fragmentary elevational section of a metal bellows seal for a direct mechanical linkage.
Fig. 11 is an elevation, partly in section, of my invention with a mercury U-trap for sealing from the mains, with differential pressure in the U a minimum at operating pressures.

This construction is illustrated in Fig. 11, which shows a housing 10' to which pressure is transmitted by a U-trap extension 12', which contains a quantity of mercury 300 as a seal. The dimensions of extension 12' are such that the bottom of the U remains full of the liquid at atmospheric pressure and the interior level 304 does not spill over into the interior of housing 10' under conditions of maximum pressure. Mercury levels 302 and 304 are approximately equalized under operating pressures. At operating pressures the volume of gas in space 44 is small and relatively large pressure variations may occur without greatly unequalizing levels 302 and 304. The mercury seal construction has the advantage of preventing dilution of the lubricating oil within the device.

Where a dry gas is used, or where condensed or suspended liquids may be trapped out, it is not necessary that the housing be filled with liquid, as hereinbefore described. This is particularly true where the gas is non-corrosive. In such case the mechanism bearings should be made self-lubricating. Also, an auxiliary liquid seal can be provided of capacity large enough to permit the entire volume of gas within the housing to be compressed to operating pressures.

Figure 12:
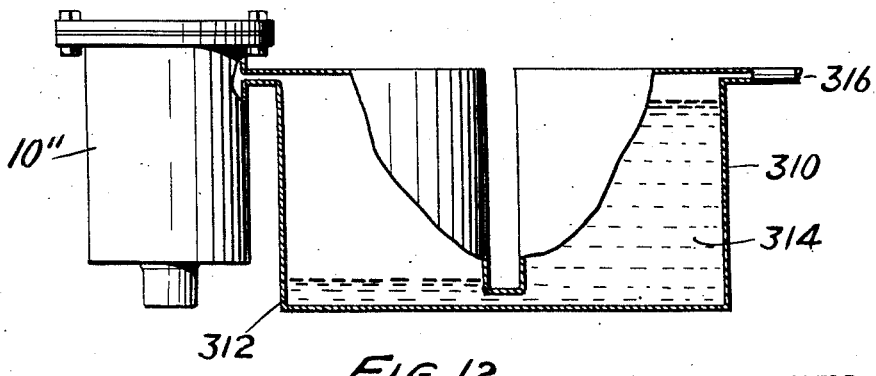
Fig. 12 is an elevation, partly in section, of a U-trap seal to permit expansion of gas in the housing from operating to atmospheric pressure.

The construction of such a seal is illustrated in Fig. 12, in which pressure is transmitted from the mains to the meter housing 10'' through a U-trap of large capacity comprising an inlet 316, an exterior arm 310 of large capacity, a similar interior arm 312, and a liquid 314 to form the seal. At atmospheric pressure, arm 310 is nearly full of liquid and arm 312 nearly empty, with the level in arm 310 falling and that in arm 312 rising as the fluid pressure is increased at inlet 316. The relative proportions of the trap and meter are such that the seal is maintained without spilling liquid into housing 10'' under conditions of maximum pressure to which the device is to be subjected.

The device may be designed for practically any pressure range. The embodiments illustrated in the drawings, however, are designed for a pressure range between 100 and 150 lbs. per sq. inch gage.

The device may be constructed with a stainless steel float to inhibit corrosion, although a float of any other material which will not amalgamate may be used, such as iron or aluminum. Similarly with respect to float stem 60. The shape of the float is shown as spherical, but it may be of any shape, the purpose of the spherical downward surface being to reduce any error due to the possibility of the device being off true vertical. One bearing for the float stem 60 is indicated at 148, Figure 2. A lower bearing being unnecessary in the construction shown as negligible error is introduced if the float 56 touches one side of the space 46.

In the illustration the cam follower 82 is shown as having a rubbing contact on the cam. In order to eliminate friction and wear at this point, the cam follower can be constructed as a roller, and further both cam and follower may be made easily replaceable.

Figure 13:
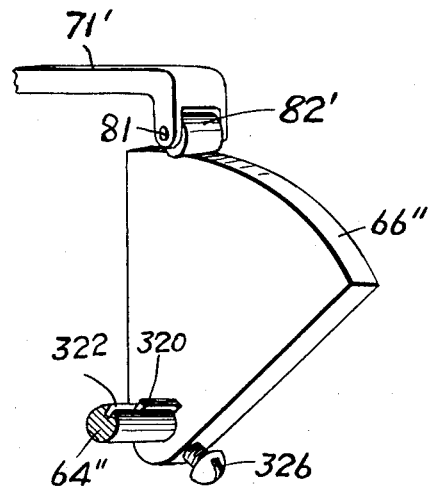
Fig. 13 is a fragmentary perspective view of a replaceable cam and roller cam follower.

Fig. 13 illustrates such construction. The extension arm 71' of the pivotally mounted electromagnet bracket is bifurcated at its outer end to form bearing members for a pin 81 carrying roller cam follower 82' which contacts the surface of a cam 66". Pin 81 is readily removable for purposes of replacement of both pin and roller. For ease in replacement, cam 66" is detachably secured to a shaft 64" by means of a key 320 in a keyway 322 in shaft 64" and a corresponding keyway in cam 66", a set screw 326 preventing longitudinal movement along said shaft.

Figure 14:
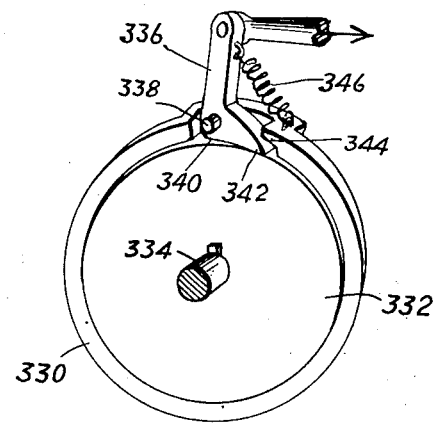
Fig. 14 is a perspective view of a nipping lever mechanism.

In order to increase the accuracy of the pawl and ratchet wheel transmission, the teeth can be made much smaller and more numerous and the number of pawls can be increased. Furthermore, the transmission may be made by any similar means, for example, by a nipping lever, a saddle-block mechanism, or a friction catch mechanism for drive and lock. Fig. 14 illustrates the nipping lever mechanism as applied in converting a reciprocating movement actuated electromagnetically or mechanically from the external source to cumulative rotation of a register-driving shaft. A loose ring 330 fits over a flat rimmed wheel 332 which is fixed to a register-driving shaft 334. A nipping-lever 336 is pivoted at one end to an arm corresponding to link 88 of Figs. 2, 3, and 4 and is pivoted on a pin 338 fixed to ring 330 and is concave on the surface 340 which is adapted to grip the wheel when a force is applied in the direction indicated by the arrow, forcing the ring tightly against the wheel on the opposite side and rotating the wheel in the indicated direction. When the lever 336 is moved in the reverse direction, the toe 342 strikes a shoulder 344 on ring 330 and slides the ring back over the wheel. A spring 346 tends to keep toe 342 in contact with the wheel so that the lost motion is negligible.

Figure 15:
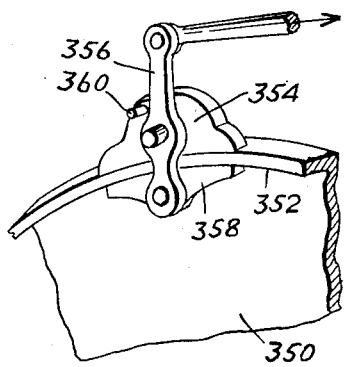
Fig. 15 is a fragmentary perspective of a saddle-block mechanism.

Fig. 15 shows a saddle-block mechanism adapted to perform the same function. Here a register driving wheel 350 has an annular rim 352 on the outside of which rests a saddle-block 354. A lever 356, pivoted at one end to an arm corresponding to link 88 of Figs. 2, 3, and 4 and pivoted to the saddle-block, projects inwardly past the rim and carries a pivotally mounted block 358 which fits the inner surface of the rim. When the lever is in such position that the pintles of blocks 354 and 358 are radially in line, the blocks slide freely along the rim. When lever 356 is moved in the direction of the arrow, the blocks grip rim 352 and further movement is communicated to wheel 350. When the lever is moved reversely, the grip is first loosened and then a stop 360 is encountered, after which further movement will slide the whole mechanism back over the wheel.

Figure 16:
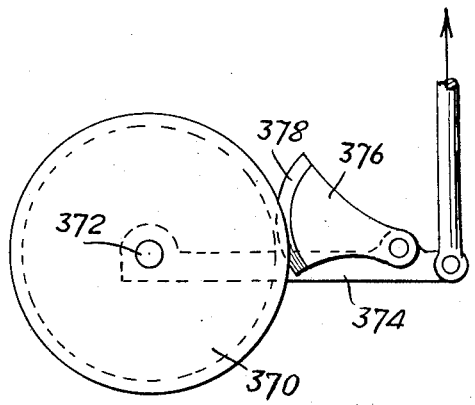
Fig. 16 is an elevation of a friction catch mechanism.

Fig. 16 illustrates a friction catch mechanism for converting the movement, in which a wheel 370 having a V-shaped groove is fixed to a register-driving shaft 372 on which a lever 374 oscillates freely. A friction catch 376 having a V-shaped edge 378 working in the groove of wheel 370 is pivoted to lever 374. Edge 378 is so shaped that movement of lever 374, which is pivoted at one end to an arm corresponding to link 88 of Figs. 2, 3, and 4, in the direction of the arrow will lock the catch in the groove, after which further movement will rotate shaft 372. Reversing the movement will release the catch and permit it to slide freely back over the wheel.

Instead of using a counter for indicating the transmitted impulses, these can be indicated on a dial gear train similar to the compensated registry, and can be made in identical units with those of the impulse transmitting meter so that their readings can be compared at a glance.

Although the float chamber adjustment has been illustrated as made with a central screw, it can be made in any convenient manner. The high adaptability of the device is illustrated by the fact that practically any correction factors may be introduced or compensated for by simply shaping the cam 66 appropriately. For example, any error due to a difference in level of mercury in chambers 44 and 46 is easily compensated by the cam shape. It should also be noted that the cam follower is always substantially perpendicularly above the axis of the cam so that there is no opportunity for error due to misalignment. Again, this construction, particularly with a roller bearing cam follower, results in a minimum of resistance to movement of the float and cam.

Figure 9:
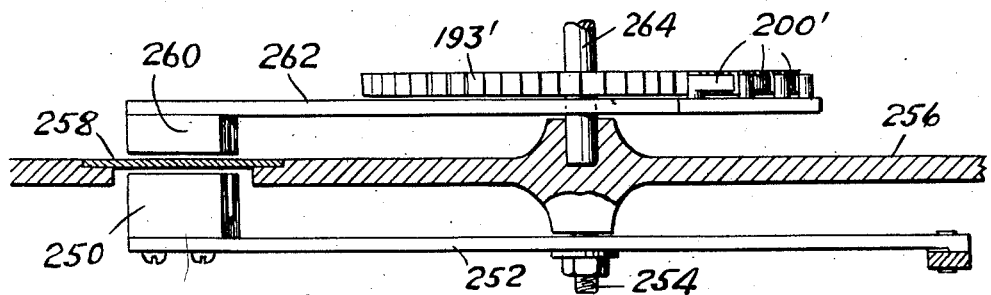
Fig. 9 is a fragmentary plan, partly in section, of a magnetically coupled oscillation transmission.

Although the embodiments illustrated have been shown as being operated by electric impulses, this is not an essential feature. For example, an external magnet may be used to operate an oscillating member through a non-magnetic wall, or a mechanically operated lever can be directly introduced into the housing by way of a sylphon bellows which will permit the necessary movement and provide a pressure seal. Fig. 9 shows a construction using an oscillating external permanent magnet 250 attached to one end of a rocker arm 252 which pivots about a pintle 254 projecting from the external face of a housing 256 adapted to have a difference in pressure on each side thereof. The other end of arm 252 is subjected to a force perpendicular to the plane of the drawings which causes the oscillations about pivot 254. Housing 256 is provided with a thin non-magnetic section 258 integral therewith and extending beyond the path traversed by magnet 250. An armature 260 is fixed to one end of an arm 262 freely pivoted on a shaft 264 whose axis is concentric with pintle 254. The other end of arm 262 is provided with a set of multiple pawls 200' adapted to co-operate with a toothed wheel 193' fixed to shaft 264. Due to magnetic linkage between armature 260 and magnet 250, arm 262 will follow the oscillations of arm 252 and the angular displacement will be accumulated on wheel 193'. The movement of arm 262 is limited at one end of its travel by a fixed stop (not shown) and at the other by a cam operated by a pressure-responsive element (not illustrated) identical with that shown in Figs. 9 and 10.

Fig. 10 illustrates a mechanically operated rocker arm 270, which is mechanically oscillated about a pivot 274 in a yoke 276, by a force external to a housing 256' acting on a link 272 pivoted to one end of arm 270. Yoke 276 is secured to the outside of housing 256' on either side of an opening 278 in said housing. One end of a metal bellows 280 is sealed pressure tight to the periphery of opening 278 and the other end to arm 270 adjacent to pivot 274. This construction permits oscillation of arm 270 with relatively slight opposition as practically the only work done is in bending the bellows which is quite flexible. The inner end of arm 270 is connected to oscillate a toothed wheel as illustrated in the other figures.

It will be obvious to those skilled in this art that the mechanisms shown in Figs. 9 and 10 may form the connection or a part of the connection between the armature 76 and the ratchet 94 which operates the register 100. In such a case, lever 252 of Fig. 9 and lever 270 of Fig. 10 will be operated by an armature corresponding to armature 76 of Fig. 2 which is in turn operated by an electro-magnet 68.

Although particular embodiments of my invention have been described in considerable detail, such description is intended as illustrative rather than limiting, as it will be obvious to those skilled in the art that various modifications may be made without departing from the spirit of the invention, and, therefore, the invention is not to be limited save as the scope of the prior art and the attached claims may require.

I claim:—

1. A pressure compensator comprising, a pressure-responsive element, a cam movable by said element in accordance with the pressure applied thereto, a register having a drive shaft, an electromagnet capable of being periodically magnetically energized by electric impulses received from an external source, an armature pivoted at one end and adapted to be drawn towards said electromagnet when said electromagnet is energized, a fixed stop, a lever attached to said armature, said lever bearing upon and having its movement limited by said cam when said armature is drawn toward said electromagnet and by said fixed stop on release thereof, a ratchet wheel fixed to the drive shaft of the register, an oscillating lever pivoted on said drive shaft, a link pivotally connecting said first-named lever and said oscillating lever, and a plurality of pawls on said oscillating lever, said pawls being adapted to engage the teeth of said wheel and being so proportioned that they come into action alternately so that the wheel can be positively advanced fractional distances of the teeth.

2. In a pressure compensator, a pressure-responsive element, a cam shaft, a cam removably fixed to said cam shaft and rotatable according to a function of the pressure, a pivoted bracket, a roller cam follower journaled in said bracket and co-operating with said cam to control the angular position of said bracket, an electromagnet fixed to said bracket, an armature adapted to be drawn to said electromagnet when energized, a fixed stop, a rotary member, an arm linked to said armature so that it is oscillated thereby on the axis of said member between the positions fixed by said stop and by said cam, a dial register coupled to and driven by said member, and means co-operating with said member and said arm whereby for each oscillation of the arm said member is unidirectionally rotated through the angle of oscillation of said arm.

3. In a pressure compensator, a pressure-responsive element, a cam mounted for rotation in response to movements of said element, a fixed stop, a register, first means mounted for movement between positions controlled by said cam and by said stop, second means for periodically operating said first means, third means connecting said first means and said register so that said first means operates said register during movement of said first means in one direction and said first means does not operate said register during movement of said first means in the opposite direction, a housing enclosing said cam and said register and said third means, a liquid in said housing, a U-trap connected to said housing and adapted to receive and transmit pressure to said pressure-responsive element, and a second liquid in said U-trap and adapted to maintain a seal to said housing even at the extreme pressures and to be at approximately equal heights in the arms of the U-trap at operating pressures.

4. The combination of claim 3, in which the second liquid is heavier than the first mentioned liquid and is adapted not to spill over into the housing at maximum pressure.

5. In a pressure compensator, a pressure-tight housing, a chamber within said housing, a compressible gas within said chamber, said chamber communicating with the interior of said housing by at least one aperture, a liquid in said housing extending into said chamber by way of said aperture and confining and compressing said gas according to the pressure existing in said housing, a float having a substantially spherical portion supported on the surface of said liquid within said housing externally to said chamber and a stem extending upward from said spherical portion, an integrating mechanism operated by periodic impulses and registering a total, said float being connected to said mechanism by said stem whereby for each impulse the registered total is increased by a quantity which is varied according to a predetermined function of the pressure within said housing, said chamber having a substantially cylindrical portion adjacent said spherical portion of said float and co-operating therewith to form a guide for said float, and stops mounted at the upper end of the path of travel of said float to limit the upward movement thereof.

6. In a pressure compensator, a pressure-tight housing having an opening therethrough, a hollow chamber detachably secured within said housing and having an extension passing through said opening, locking means secured to said extension and adjusting said chamber relative to said housing, a compressible gas within said chamber, said chamber communicating with the interior of said housing by at least one aperture, a liquid in said housing extending into said chamber by way of said aperture and confronting and compressing said gas according to the pressure existing within said housing, a float supported on the surface of said liquid within said housing externally to said chamber, and an integrating mechanism operated by periodic impulses and registering a total, said float being operatively connected to said mechanism by connections completely within said housing whereby for each impulse the registered total is increased by a quantity which is varied according to a predetermined function of the pressure within said housing.

WALTER C. WAGNER.